(12) United States Patent
Abbott

(10) Patent No.: US 6,291,043 B1
(45) Date of Patent: Sep. 18, 2001

(54) PREINSULATED TUBE END CAP, END CAPPED PREINSULATED TUBE AND METHOD OF INSTALLING END CAP

(76) Inventor: Anthony G. Abbott, 6480 Argenta Trail, Inver Grove Heights, MN (US) 55077

(*) Notice: Subject to any disclaimer, the term of this patent is extended or adjusted under 35 U.S.C. 154(b) by 0 days.

(21) Appl. No.: 09/454,362

(22) Filed: Dec. 3, 1999

(51) Int. Cl.$^7$ .................................................. B32B 1/08

(52) U.S. Cl. ..................... 428/36.9; 428/34.1; 138/149

(58) Field of Search .................. 428/34.1, 36.91; 138/149

(56) References Cited

PUBLICATIONS

Parker Hannifin Corp trade literature for end seal boots (2 pages) undated.
Furon trade literature for Seal–Tite End Boots (9 pages) undated.

*Primary Examiner*—Harold Pyon
*Assistant Examiner*—Marc Patterson
(74) *Attorney, Agent, or Firm*—Richard Francis

(57) ABSTRACT

An easy to install one-piece end cap is provided to protect the cut end of insulation over a preinsulated tubing. The end cap has a tubular body which is dimensioned to receive the uncompressed cut end of the insulation in a first passageway portion and, in a second passageway portion to provide a snug fit. A third passageway portion is dimensioned to slide over the exposed end of the tubing so that it may exit the end cap to permit connection. A tube end capped with the end cap is also provided, as is a method of end capping a preinsulated tube.

11 Claims, 1 Drawing Sheet

PREINSULATED TUBE END CAP, END CAPPED PREINSULATED TUBE AND METHOD OF INSTALLING END CAP

FIELD OF THE INVENTION

The present invention provides an easy to install one-piece end cap to protect the cut end of insulation over preinsulated tubing, a method of applying such an end cap and a preinsulated tube with at least one end capped with the end cap.

BACKGROUND

Preinsulated tubing is typically used to transport any of a variety of fluids, including low and high temperature fluids such as steam from one point to a distant point. Preinsulated tubing is characterized by having one or more conduits, typically steel or copper tubing, surrounded by insulation, typically fiberglass insulation, which is commonly contained within an outer sleeve or jacket of a waterproof, oil-resistant, corrosive-resistant material such as flame-resistant polyvinyl chloride (PVC). One example of such preinsulated tubing is that sold under the trade designation TEMP-TUBE™ preinsulated tubing by Parker Hannifin Corporation of Ravenna, Ohio. There are many other suppliers of such tubing.

When such preinsulated tubes are cut to make connections, it is customary to cut the tube and then cut away a small segment of the insulation adjacent the end of the tube to facilitate making the connection. When doing this the manufacturer of the preinsulated tubing cautions that it is absolutely necessary to seal the ends of the insulation against contamination from moisture and/or corrosive liquids.

DESCRIPTION OF RELATED PRIOR ART

Heat shrinkable end boots are commercially available under the trade designation SEAL-TITE END BOOTS™ from Furon, Inc. of Cape Coral Fla. The heat shrinkable boots are made of thermally stabilized, modified polyolefin and are shaped to provide a flexible boot to slide over the cut end of the conductor and insulation and are then shrunk in place by use of a heat gun which requires the user to come prepared with a heat gun and hope that there is an electrical outlet to power it. The supplier also provides clamps for the ends of the boot which appears to indicate that the heat shrunk boot per se is not sufficient to provide the necessary protection.

Furon, Inc. also offers an end cap under the trade designation SPEED CAP™ apparently for faster installation than that provided by the SEAL-TITE END BOOT™ equipment. The SPEED CAP device is characterized by being formed of conformable sheet metal, preformed in the shape of a side slit tubular body folded in on one end to provide a truncated cone shape. In use, silicon sealant is applied to the inner portion of the tubular body or the cut end of the insulation and the edges of the slit are joined and a clamp is applied to permanently hold it together.

Furon, Inc. offers yet another way of protecting the cut end of the insulation by use of an end sealing silicone rubber grommet with end sealant. The insulation is pushed back under the jacket, a rubber grommet is slid in place over the tubing under the jacket end so that the grommet's outer edge coincides with the end of the jacket, the sealant is applied over the tubing and the inner surface of the jacket and a plastic clamp is attached over the jacket so that it clamps down on the grommet.

A need exists for a simpler way of protecting the cut end of the insulation on preinsulated tubing.

SUMMARY OF THE INVENTION

The present invention provides a one-piece device for conveniently protecting the cut end of insulation on a preinsulated tubing. The device requires no clamp and it is simple to install.

More specifically, the present invention provides an end cap to cover the cut end of compressible insulation surrounding a fluid conduit having an exposed end which extends beyond the cut insulation end. The end cap comprises a rigid body being comprised of a rigid material preferably having a low heat conductivity and at least one open-ended passageway having an inner wall therethrough. The passageway includes a first passageway portion dimensioned to receive the uncompressed end of the insulation, a second intermediate passageway portion dimensioned to compress the uncompressed end of the insulation as the cut end is forced into the second passageway portion so that once forced into the second intermediate passageway portion, the end cap will fit snugly over a portion of the insulation adjacent the cut end and a third passageway portion having a portion dimensioned to block the further passage of the cut end and being dimensioned to slidably fit over the exposed end of the conduit so that a portion of the exposed end of the conduit extends beyond the end cap.

The end cap may be comprised of any rigid material which will maintain its dimensions in use and preferably is comprised of a material having a low heat conductivity if used on an insulated tube used to transfer fluids that are at other than ambient temperature. The term "rigid" is not intended to imply that the shaped body is inflexible. On the contrary, it may have some flexibility as long as it retains its dimensions in use. The term "rigid" is intended to exclude elastic materials. Suitable materials from which the end cap may be formed include, for example, thermoset plastics, thermoplastic materials, hard rubber materials and ceramic materials. Thermoplastic materials and hard rubber materials should be selected to maintain structural integrity and dimensions at the temperature of use. The end cap for use with insulated steam conduits is preferably comprised of a heat-resistant plastic material such as tetrafluoroethylene-perfluro (propyl vinyl ether) copolymer (TFE-PPVE Copolymer) commercially available from DuPont Fluoroproducts of Wilmington, Delaware under the trade designation TEFLON™ 340 PFA fluoropolymer resin.

The end cap of the invention may have more than one third passageway portion to accommodate more than one fluid conduit within the same compressible insulation. The end cap may also include one or more additional passageway portions to accommodate various accessories which may be contained within the insulation, running along side the conduit but may not be conduits themselves. Examples of such accessories include electric tracings for heating the conductor or other sets of wires or tubes.

The end cap of the invention may also have one or more ribs extending around or along the inner wall of the second passageway to provide addition resistance to removal of the insulation end inserted therein or one or more ribs extending around or along the inner wall of the third passageway to improve the seal with the conduit contained therein.

The invention further provides an insulated conduit comprising:

a. a conduit having a tubular body having an inner surface and an outer surface, the tubular body preferably being capable of withstanding the passage of high temperature fluid, an inlet opening at one end and an exit opening at an opposite end;

b. a length insulation having a first cut end and a second cut end deployed over the outer surface of the conduit wall except for a portion of the outer surface adjacent at least one end of the conduit to leave at least one exposed end of the conduit which extends beyond the exposed end of the length of insulation; and c. an end cap comprising a rigid body, preferably being comprised of a rigid, preferably high-temperature-resistant material having a low heat conductivity and at least one open-ended passageway having an inner wall therethrough including a first passageway portion dimensioned to receive the uncompressed end of the insulation and a second intermediate passageway portion dimensioned to compress the uncompressed end of the insulation as the cut end is forced into the second passageway portion so that, once forced into the second intermediate passageway portion, the end cap will fit snugly over a portion of the insulation adjacent the cut end and a third passageway portion having a portion dimensioned to block the further passage of the cut end dimensioned to slidably fit over the exposed end of the conduit so that a portion of the exposed end of the conduit extends beyond the end cap.

The end-capped insulated conduit of the invention preferably includes a high temperature caulk inserted between at least a portion of the inner wall of the passageway and the outer wall of the conduit.

The invention also provides a method of capping a cut insulation end of compressible insulation deployed over a fluid conduit having an exposed end which extends beyond the cut end of the cut insulation, the method comprising:

a. providing an end cap to cover the cut end of compressible insulation surrounding a fluid conduit having an exposed end which extends beyond the cut insulation end, the end cap comprising a rigid body, preferably being comprised of high-temperature-resistant material having a low heat conductivity and a passageway having an inner wall therethrough including a first passageway portion dimensioned to receive the uncompressed end of the insulation, a second passageway portion dimensioned to fit snugly over a portion of the insulation adjacent the cut end and a third passageway portion dimensioned to slidably fit over the exposed end of the conduit so that a portion of the exposed end of the conduit extends beyond the end cap; and b. sliding the end cap over the conduit so that the end cap snugly fits over the cut end of the insulation and the conduit end fits through and extends beyond the end cap.

BRIEF DESCRIPTION OF THE DRAWING

The invention is further illustrated by reference to the figures of the drawing wherein.

DETAILED DESCRIPTION

Figure 1:
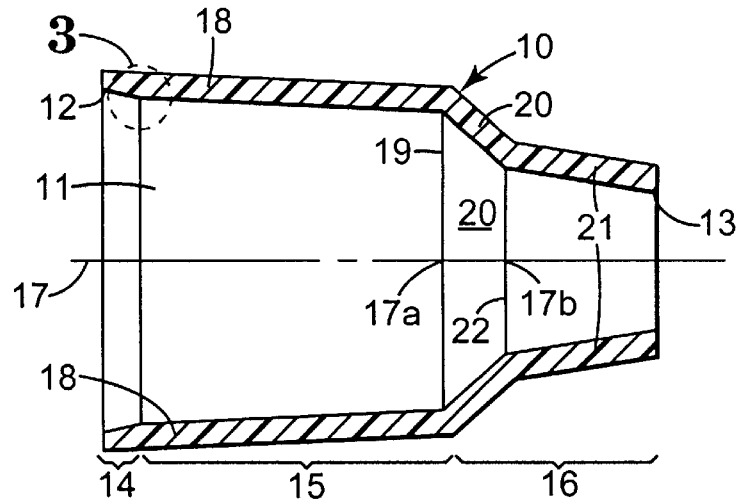
FIG. 1 is an enlarged cross sectional view of an end cap according to the invention.

FIG. 1 shows an end cap 10 according to the invention which is in the form of a shaped tubular body which includes an open-ended passageway 11 having an insulation covered conduit receiving end 12 and an uninsulated conduit exit opening 13. Passageway 11 is characterized by three portions, a first portion 14 for receiving the uncompressed end of compressible insulation which is deployed over conduit 30 (shown in FIG. 2), a second portion 15, that is dimensioned to provide a snug fit as cut insulation end 31 is forced therein, e.g., by having a diameter smaller than that of the cut end of the insulation so as to cause it to compress, and portion 16, into which the insulation is not intended to be inserted but which will slide over the uninsulated portion 32 (see FIG. 2) of the high temperature conduit so that an exposed end 33 extends beyond opening 13 of the end cap for the appropriate installation of a fitting or connector. Passageway 16 includes wall portion 20 which is dimensioned to prevent the further passage therethrough of cut end 31.

The dimensions of the end cap should be selected for the particular preinsulated tubing that is to be capped. For TEMPTUBE™ preinsulated tubing part No. 3000-108A035 having a 0.5 inch outer diameter (O.D.) copper tubing conduit and a nominal 1.14 inch product outer diameter (O.D.), it is preferred to use an end cap having a conduit exit opening 13 of about 0.5 inch to provide a sliding fit and an insulation end receiving opening 12 of about 1.15 inch tapering to 1.125 inch in about 0.170 inch. The taper at the opening is preferably about 15° from a central axis 17 which passes through the center of passageway 11. Intermediate passageway 15 is provided by slightly inwardly tapering wall portion 18 of end cap 10, tapering inward at an angle, for example, on the order of about 3° from axis 17 to line 19 where it intersects with wall portion 20 which tapers inward at a somewhat greater angle, e.g., 45° from axis 17 to provide wall portion 20 as a barrier to the further passage of insulation end (see FIG. 2) into end cap 10. Wall portion 20 intersects with wall portion 21 at line 22. Wall portion 21 is at an angle somewhat less than wall portion 20 with respect to axis 17, that being, for example, 9°. The fact that wall portions 20 and 21 are angled, as shown, leaves a high temperature caulk-receiving space 34 to receive a quantity of caulk 35 between the uninsulated conductor outer surface and the inner surfaces of wall portions 20 and 21 so that the end cap may be sealed to prevent liquids from entering.

End cap 10 for the size of the preinsulated conduit described above is preferably 1.875 inch long with a wall thickness preferably of 0.093 inch. The dimensions along axis 17 from opening 12 are 1 ⅛ inch to point 17a on an area defined within line 19 and 1 ⅜ inch to a point 17b to an area defined within line 22. The distance between point 17b and opening 13 is ½ inch.

It should be understood that the dimensions that are set forth above only apply to the particular preinsulated conduit identified above and they would not apply to all varieties of preinsulated conduits since they are available in a multitude of sizes and shapes. End caps according to the invention would have to be created for each size of preinsulated conduit. Such creation would be well within the ability of one skilled in the art after reading the description of the invention set forth herein.

Figures 3A, 3B:
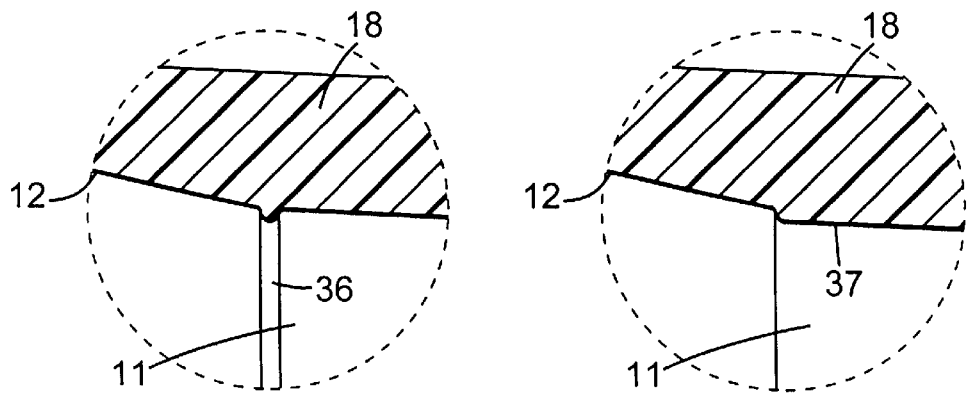
FIGS. 3a and 3b are enlarged cross sectional views of alternative embodiments of that part of the end cap depicted in FIG. 1 contained within area 3.

FIGS. 3a and 3b show alternative configurations at the beginning of the second passageway 15 which may include one or more internal peripherally projecting ribs, such s rib 36, shown in FIG. 3a or longitudinally extending rib, such as rib 37, shown in FIG. 3b, which are intended to provide an even tighter fit. Rib 37 may have a cross-sectional shape the same as that for rib 36 in FIG. 3a or may have an alternative shape. Such ribs need not be continuous, but may be comprised of multiple rib segments (not shown). The same alternative may exist within the passageway portion contained within wall portion 21 for the same purpose. Further, the ribs at the beginning of the second passageway portion may be in the form of threads.

End cap 10 may be formed in any shape as long as it provides the functions described above, but preferably it is formed in the shape shown with an unslit tubular body dimensioned as shown above. The outer shape of the end cap is not as important as the internal shape.

End caps according to the invention may be shaped by any conventional method depending upon the material selected for its construction. Such shaping techniques may include machining, injection molding, compression molding, spin casting and others. End caps may be constructed of ceramic materials or preferably high temperature resistant plastic materials. Ceramic end caps may be made by casting in the appropriate shape a green structure comprised of precursor materials, e.g., aluminum oxide powder and a suitable binder, and firing the green structure to produce an integral ceramic shape. The dimensions of the green structure should take into account any expected shrinkage caused by firing. The making of ceramic parts in this manner is well-known in the art.

The materials which form the end cap preferably have a low heat conductivity if they are intended for use on conduits that are used to transport fluids at other than ambient temperatures to prevent, for example, the end cap undesirably heating up which may cause a burn one touching it or cooling which may cause water to condense on its surface.

Suitable plastic materials may be machined to produce the desired shape or they may be molded preferably by injection molding. Such molding techniques are well-known in the art and such parts may be fabricated by commercial injection molding companies. The preferred material for injection molding the end cap is that sold by DuPont Fluoroproducts of Wilmington, Del. under the trade designation TEFLON™ 340 TFE-PPVE Copolymer.

Injection molding involves preparing an appropriate mold which will produce an end cap of the desired shape, placing the mold in a commercial injection molding device, charging the device with the plastic material to be molded, heating the plastic material to the appropriate temperature to cause it to flow and forcing the heated plastic material into the mold. The mold is then opened, the part removed and any unwanted runner or sprue, if present, removed. Such equipment and process steps are well-known in the art.

Figure 2:
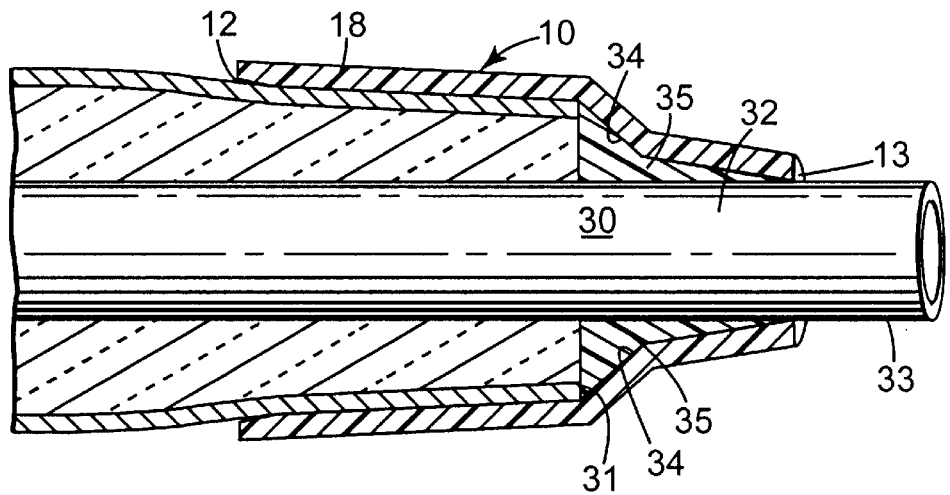
FIG. 2 is an enlarged cross sectional view of a preinsulated conduit end capped with the end cap shown in FIG. 1 according to the invention.

The end cap is used by preparing an end of preinsulated tubing by cutting the insulation from one end, preferably with a right angle cut to leave a cut end 31 as shown in FIG. 2, to expose a sufficient length of tubing, that being shown as reference numerals 32 and 33 in FIG. 2. The tube end is then forced into opening 12 of end cap 10 until cut end 31 is compressed within wall portion 18 until the cut end strikes wall portion 20 where it will stop with a portion 32 of the uninsulated tube being contained within the end cap and portion 33 of the uninsulated tube extending out of opening 13. Preferably, before the tube is inserted into the end cap, an appropriate caulk is applied either within the end cap or to the surface of the exposed tubing so that caulk 35 will fill space 34 to prevent liquids from entering the insulation. A suitable high temperature resistant caulk is that commercially available from Rutland Fire Clay Company, Gastonia, North Carolina under the trade designation RUTLANT™ 76R 600° RTV Silicone Sealant. Any other caulk suitable for use under the conditions of use may also be used.

The compressed end of the insulation within the end cap provides a strong connection between the insulation and the end cap resists failure, particularly if the connection has also been caulked. The end cap is simple, in one piece, and it requires no external clamps or heating devices for application.

What is claimed is:

1. An end cap to cover the cut end of insulation surrounding a fluid conduit having an exposed end which extends beyond said cut insulation end, said end cap comprising a rigid body being comprised of a rigid material having at least one open-ended ended passageway having an inner wall therethrough including a first passageway portion dimensioned to receive the uncompressed end of said insulation, a second intermediate passageway portion dimensioned to compress the uncompressed end of said insulation as the cut end is forced into the second passageway portion, once inserted into the second intermediate passageway portion, the end cap will fit over a portion of said insulation adjacent said cut end and a third passageway portion dimensioned to prevent the further passage of said cut end and to slidably fit over said exposed end of said conduit so that a portion of said exposed end of said conduit extends beyond the end cap.

2. The end cap of claim 1 wherein said body is comprised of heat-resistant plastic material.

3. The end cap of claim 1 wherein said body is comprised of tetrafluoroethylene-perfluoro (propyl vinyl ether) copolymer.

4. The end cap of claim 1 wherein said passageway has more than one third passageway portion to accommodate more than one fluid conduit within said insulation.

5. The end cap of claim 1 wherein said passageway includes at least one rib extending from said inner wall.

6. An insulated conduit comprising:
   a. a conduit having a tubular body having an inner surface and an outer surface, an inlet opening at one end and an exit opening at an opposite end;
   b. a length insulation having a first cut end and a second cut end deployed over the outer surface of said conduit wall except for a portion of said outer surface adjacent at least one end of said conduit to leave at least one exposed end of said conduit which extends beyond the exposed end of said length of insulation; and
   c. an end cap comprising a rigid body being comprised of a rigid material and having at least one open-ended passageway having an inner wall therethrough including a first passageway portion dimensioned to receive the uncompressed end of said insulation and a second intermediate passageway portion dimensioned to compress the uncompressed end of said insulation as the cut end is inserted into the second passageway portion, once inserted into the second intermediate passageway portion, the end cap will fit over a portion of said insulation adjacent said cut end and a third passageway portion dimensioned to prevent the further passage of said cut insulation end and to slidably fit over said exposed end of said conduit so that a portion of said exposed end of said conduit extends beyond said end cap.

7. The insulated conduit of claim 6 wherein caulk is inserted between at least a portion of the inner wall of said passageway and the outer wall of said conduit.

8. The insulated conduit of claim 6 wherein said body of said end cap is comprised of plastic material.

9. The insulated conduit of claim 6 wherein said body of said end cap is comprised of tetrafluoroethylene-perfluoro (propyl vinyl ether) copolymer.

10. A method of capping a cut insulation end of insulation deployed over a fluid conduit having an exposed end which extends beyond the cut end of said cut insulation, said method comprising:

a. providing an end cap to cover the cut end of compressible insulation surrounding a fluid conduit having an exposed end which extends beyond said cut insulation end, said end cap comprising a rigid body being comprised of a rigid material and having an open-ended passageway having an inner wall therethrough including a first passageway portion dimensioned to receive the uncompressed end of said insulation, a second passageway portion dimensioned to fit over a portion of said insulation adjacent said cut end and a third passageway portion dimensioned to slidably fit over said exposed end of said conduit a portion of said exposed end of said conduit extends beyond the end cap; and b. sliding said end cap over said conduit so that the end cap snugly fits over said cut end of said insulation and said conduit end fits through and extends beyond the end cap.

11. The method of claim 10 including the step of depositing caulk on at least one of the inner wall of said passageway, the outer surface of said portion of insulation to fit within the passageway or the outer surface of said conduit to fit within said passageway.

* * * * *